US009796600B2

(12) United States Patent
Shotey et al.

(10) Patent No.: US 9,796,600 B2
(45) Date of Patent: Oct. 24, 2017

(54) WATER CONTAINER WITH FLOATABLE FILTER

(71) Applicant: Bonvi Water, Inc., Scottsdale, AZ (US)

(72) Inventors: Marcus J. Shotey, Scottsdale, AZ (US); Jason Swanson, Fountain Hills, AZ (US); David M. Daniel, Phoenix, AZ (US)

(73) Assignee: Bell Sports, Inc., Scotts Valley, CA (US)

( * ) Notice: Subject to any disclaimer, the term of this patent is extended or adjusted under 35 U.S.C. 154(b) by 0 days.

(21) Appl. No.: 15/348,888

(22) Filed: Nov. 10, 2016

(65) Prior Publication Data

US 2017/0065914 A1    Mar. 9, 2017

Related U.S. Application Data

(63) Continuation-in-part of application No. 14/302,205, filed on Jun. 11, 2014.
(Continued)

(51) Int. Cl.
| | |
|---|---|
| *B01D 35/05* | (2006.01) |
| *C02F 1/00* | (2006.01) |
| *B01D 35/02* | (2006.01) |
| *B01D 33/01* | (2006.01) |
| *A47J 31/20* | (2006.01) |

(52) U.S. Cl.
CPC ............... *C02F 1/003* (2013.01); *A47J 31/20* (2013.01); *C02F 2201/004* (2013.01); *C02F 2307/04* (2013.01)

(58) Field of Classification Search
CPC  C02F 1/003; C02F 2307/04; C02F 2201/004; A47J 31/20; B01D 35/05; B01D 33/01
See application file for complete search history.

(56) References Cited

U.S. PATENT DOCUMENTS

| 310,204 A * | 1/1885 | Jenks ...................... A47J 31/20 99/319 |
|---|---|---|
| 3,319,577 A | 5/1967 | Herreshoff |

(Continued)

FOREIGN PATENT DOCUMENTS

| CN | 104665434 | 6/2015 |
|---|---|---|
| CN | 104860368 | 8/2015 |

(Continued)

*Primary Examiner* — Bobby Ramdhanie
*Assistant Examiner* — Denise R Anderson
(74) *Attorney, Agent, or Firm* — Booth Udall Fuller, PLC

(57) ABSTRACT

A portable drinking water filter system, such as a pitcher, having a floatable body including a filter opening configured to receive a water filter, the floatable body having a seal extending outward from an outer surface of the floatable body. The floatable body is disposed in a container cavity such that a body seal engages the sidewall and restricts water from passing between the floatable body and the sidewall. The seal is configured to create friction with the sidewall, wherein the friction created when the floatable body rises in the container is different than when the floatable body lowers in the container. The friction created when the floatable body rises in the container is greater than when the floatable body lowers in the container, allowing the floatable body to auto-retract toward a cavity base without burping.

28 Claims, 16 Drawing Sheets

Related U.S. Application Data

(60) Provisional application No. 61/920,021, filed on Dec. 23, 2013, provisional application No. 61/976,276, filed on Apr. 7, 2014, provisional application No. 62/420,105, filed on Nov. 10, 2016.

(56) References Cited

U.S. PATENT DOCUMENTS

| | | | |
|---|---|---|---|
| 4,151,092 A | 4/1979 | Grimm et al. | |
| 5,919,365 A | 7/1999 | Collette | |
| 6,387,260 B1* | 5/2002 | Pimenov | B01J 47/002 |
| | | | 210/282 |
| 6,524,477 B1* | 2/2003 | Hughes | C02F 1/003 |
| | | | 210/282 |
| 7,323,104 B2 | 1/2008 | Wennerström | |
| 7,767,087 B2 | 8/2010 | Wilson | |
| 7,790,117 B2 | 9/2010 | Ellis et al. | |
| 7,807,052 B2 | 10/2010 | Milne | |
| 7,955,501 B2 | 6/2011 | Wilson | |
| 8,216,462 B2 | 7/2012 | o'Brien et al. | |
| 8,313,644 B2 | 11/2012 | Harris et al. | |
| 2006/0151381 A1* | 7/2006 | Wennerstrom | C02F 1/003 |
| | | | 210/464 |
| 2007/0284300 A1 | 12/2007 | Bidlingmeyer et al. | |
| 2010/0065488 A1* | 3/2010 | Milne | B01D 33/01 |
| | | | 210/242.1 |
| 2010/0320135 A1 | 12/2010 | Sun | |
| 2014/0008311 A1 | 1/2014 | Weston et al. | |

FOREIGN PATENT DOCUMENTS

| | | |
|---|---|---|
| DE | 1298882 | 7/1969 |
| DE | 19603884 | 3/1997 |
| FR | 3018459 | 9/2015 |
| WO | 0057985 | 10/2000 |
| WO | 2005009215 | 10/2005 |

* cited by examiner

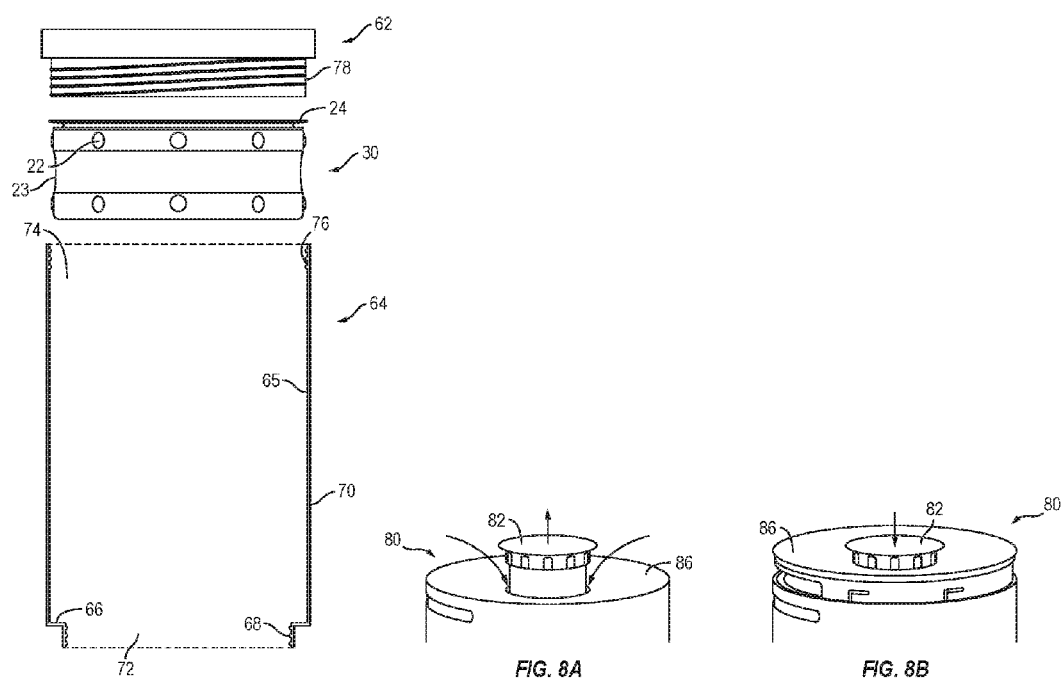

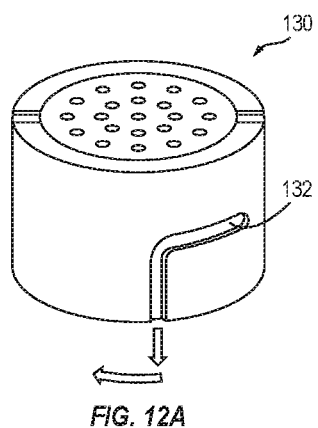
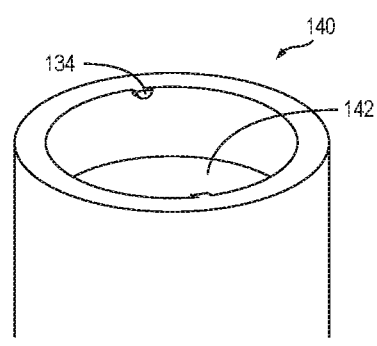
FIG. 12A
FIG. 12B

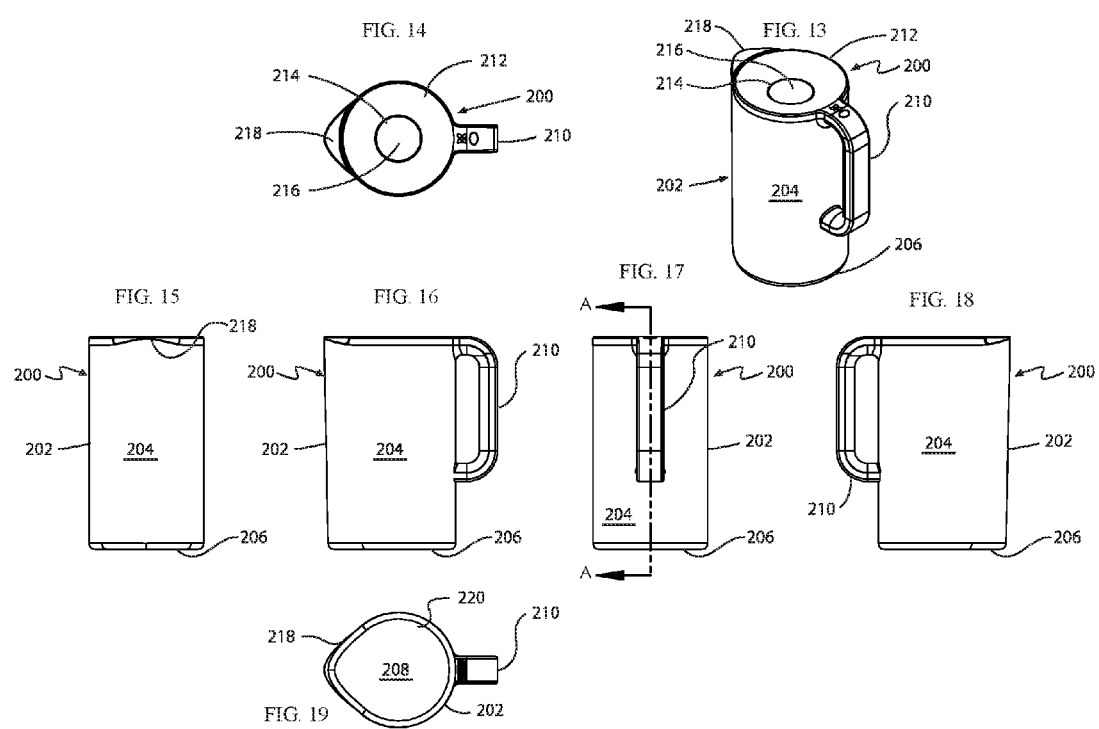

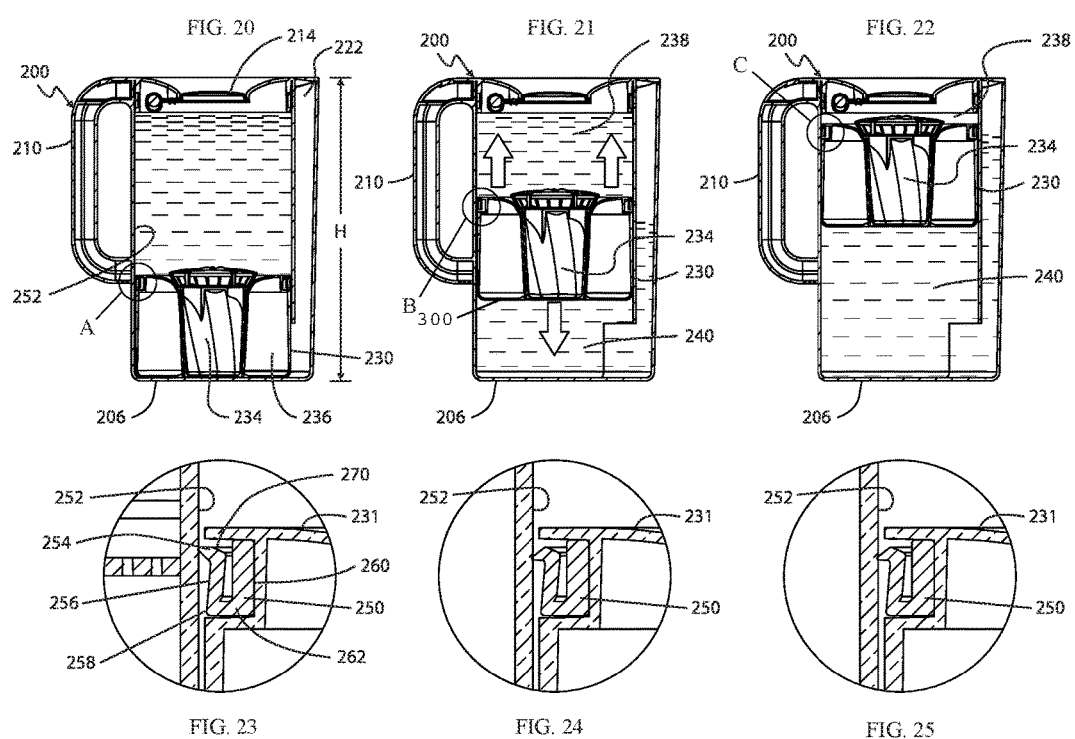

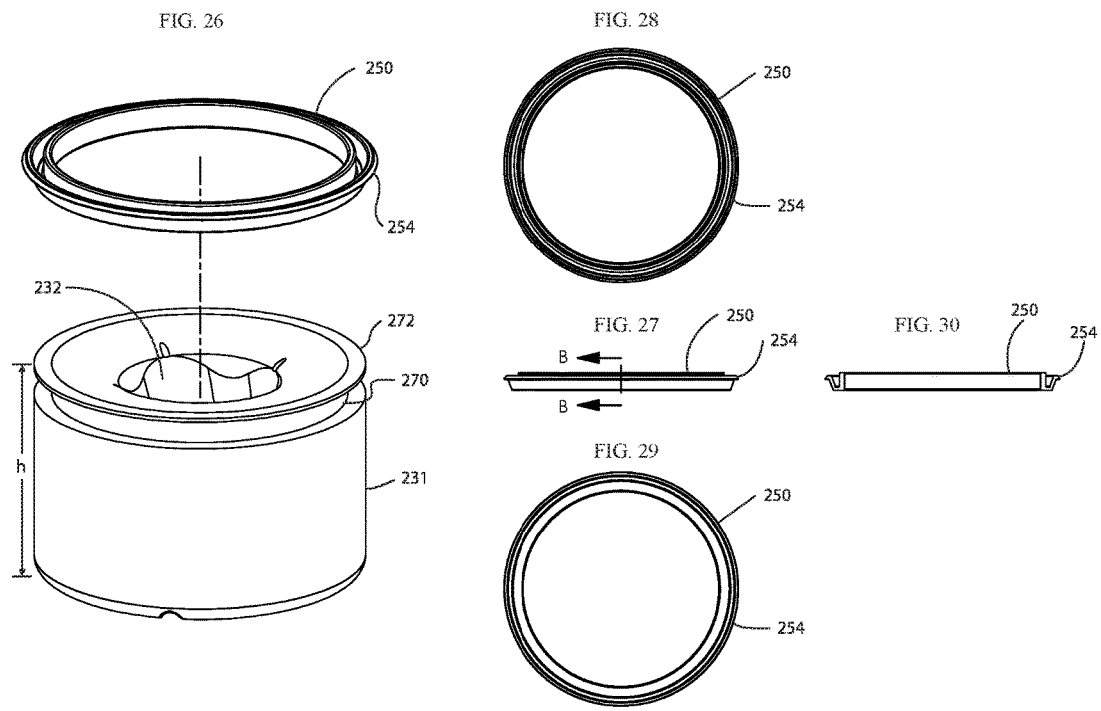

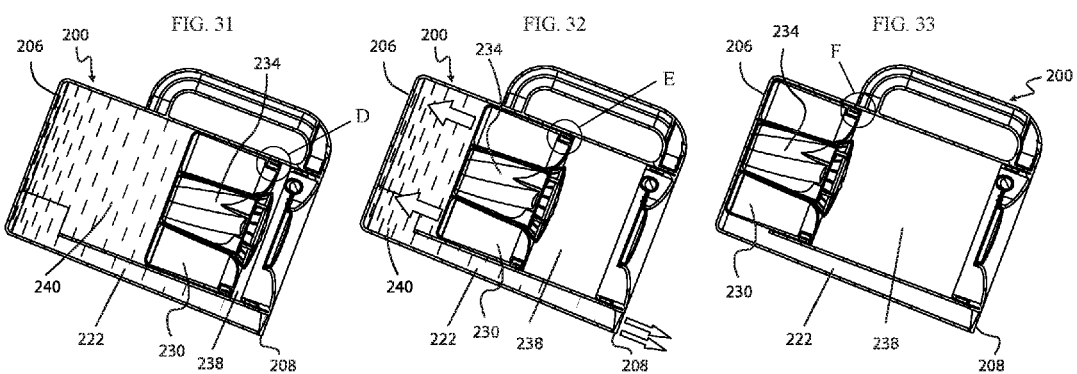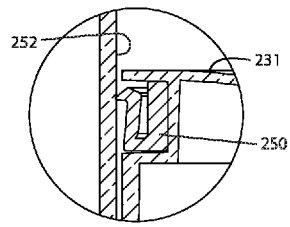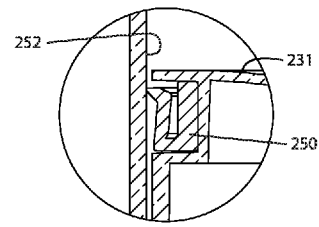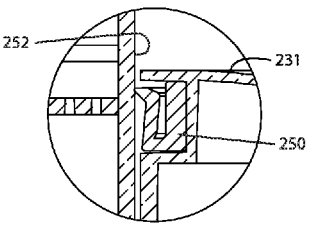

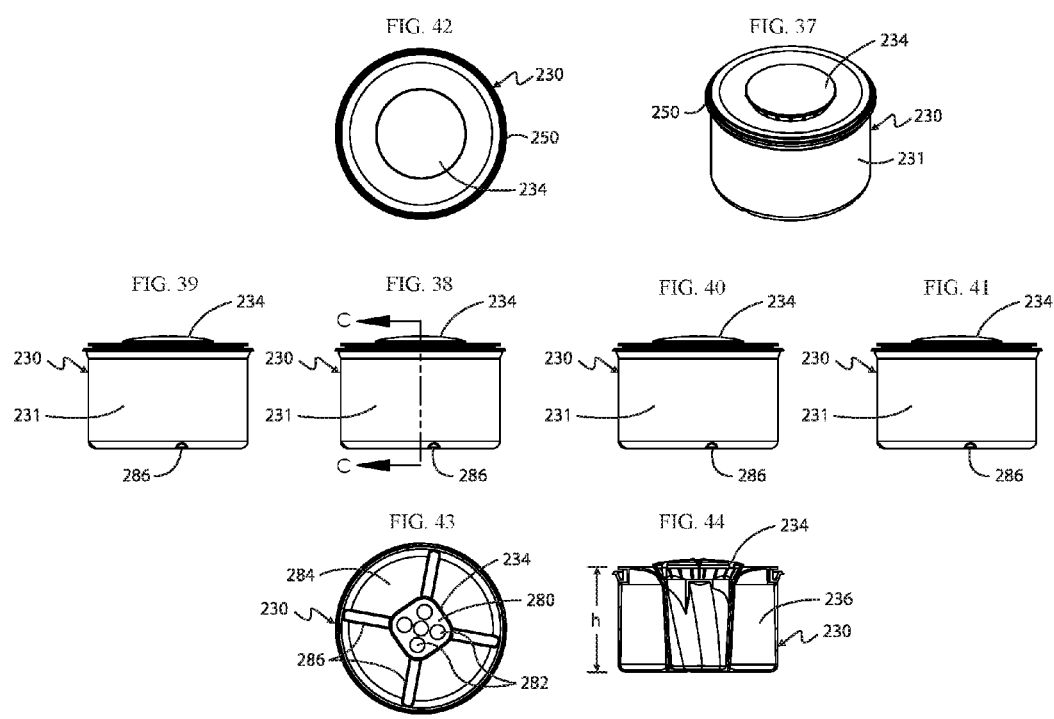

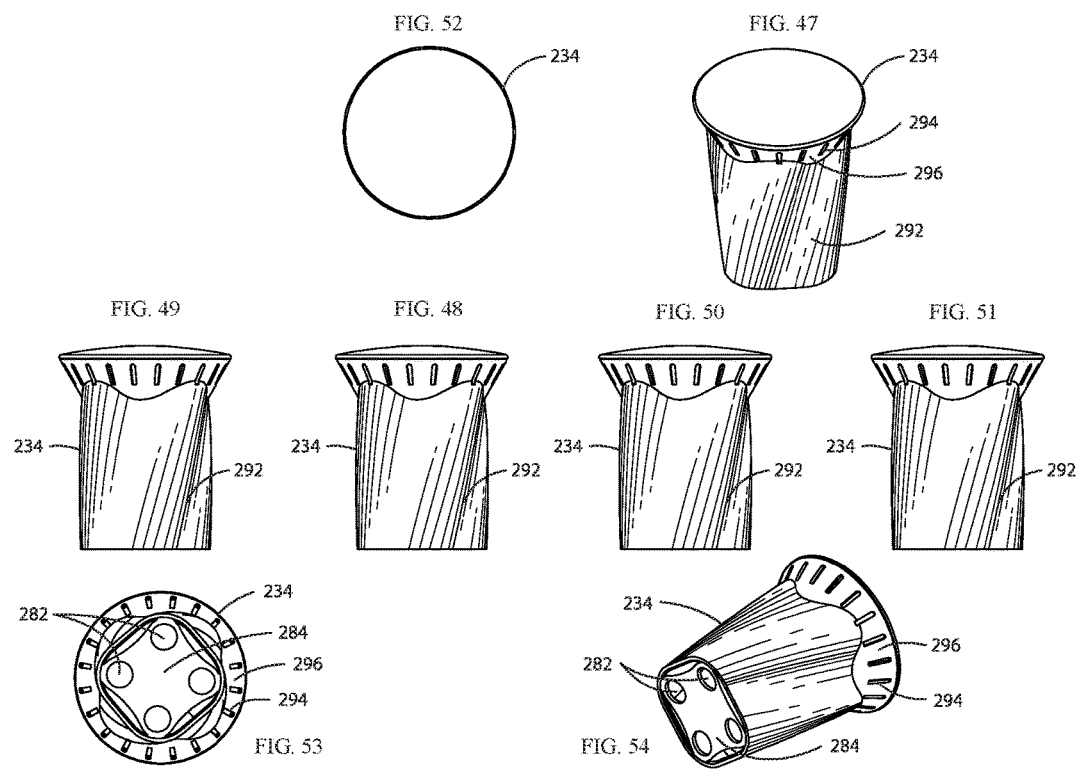

WATER CONTAINER WITH FLOATABLE FILTER

CROSS REFERENCE TO RELATED APPLICATIONS

This application is a continuation-in part of U.S. patent application Ser. No. 14/302,205, entitled "WATER FILTER SYSTEMS AND METHODS OF USE" to Shotey et al., which was filed on Jun. 11, 2014, which document claims the benefit of the filing date of U.S. Provisional Patent Application 61/920,021, entitled "WATER FILTER SYSTEMS AND METHODS OF USE" to Shotey et al., which was filed on Dec. 23, 2013, the contents of which is hereby incorporated herein by reference, and also claims the benefit of the filing date of U.S. Provisional Patent Application 61/976,276, entitled "WATER FILTER SYSTEMS AND METHODS OF USE" to Shotey et al., which was filed on Apr. 7, 2014, the contents of each of which are hereby incorporated herein by reference. This application also claims benefit of U.S. Provisional Patent application 62/420,105, entitled "WATER FILTER SYSTEMS AND METHODS OF USE" to Shotey et al., which was filed Nov. 11, 2016, the disclosure of which is hereby incorporated herein by reference.

TECHNICAL FIELD

The present disclosure is generally related to the field of water filtration containers, including water pitchers, having filters configured to provide filtered water.

BACKGROUND

Pitchers with an attachable water filter are frequently used by consumers who wish to filter tap water before drinking or use. Typical filters couple to a reservoir which fixedly sits within the water pitcher. These reservoirs, however, are usually relatively small compared to the amount of space available within the pitcher for carrying purified water. If, however, the reservoir is enlarged to increase the unfiltered water capacity of the reservoir, the size of the filtered water space decreases. Thus, conventional water filtration pitchers require multiple fills of the reservoir to fill the volume of the filtered water space, which is very time consuming, frustrating, and can take up to 15 minutes or more.

SUMMARY

The present disclosure includes a portable drinking water filter system, such as a pitcher or a handheld container, having a floatable body including a filter opening configured to receive a water filter, the floatable body having a seal extending outward from an outer surface of the floatable body. The floatable body is disposed in a container having a cavity, wherein the floatable body is disposed in the cavity such that the seal is configured to engage the one or more sidewalls and restrict water from passing between the floatable body and the one or more sidewalls. The seal is configured to create friction with the one or more sidewalls, wherein the friction created when the floatable body rises in the container is different than when the floatable body lowers in the container. The friction created when the floatable body rises in the container is greater than when the floatable body lowers in the container. The container may have a lower dispenser, such as a spigot, allowing filtered water to be dispensed from proximate the container base.

Aspects of the disclosure relate to a portable drinking water filter system, that may comprise a floatable body having a filter opening adapted to receive a water filter, the floatable body having a seal extending outward from an outer surface of the floatable body, and a container having an upper opening, one or more sidewalls, and a base opposite the upper opening together defining a cavity, wherein the floatable body is disposed in the cavity such that the seal is configured to engage the one or more sidewalls and restrict water from passing between the floatable body and the one or more sidewalls, wherein the seal is configured to create friction with the one or more sidewalls, wherein the friction created when the floatable body rises in the container is different from the friction when the floatable body lowers in the container.

Particular embodiments may include one or more of the following features. The ratio of the floatable body volume to the container volume may be within the range of ¼ to ½. The friction created when the floatable body rises in the container may be greater than the friction created when the floatable body lowers in the container. The container may comprise a pitcher having a handle, and a channel extending from the cavity proximate the base to proximate the upper opening, the channel configured to dispense water in the cavity proximate the pitcher opening when tipped. The seal may be configured such that water can be dispensed from the cavity via the channel without burping. The seal may have a movable extension configured to engage the one or more sidewalls. The seal extension may engage the one or more sidewalls at a first angle relative to the floatable body when the floatable body rises, and a second angle when the floatable body lowers. The seal may comprise a y-ring. The y-ring may have a web portion configured to allow the y-ring to bend about the web portion. The y-ring may have a first portion configured to engage the floatable body, and a second portion extending outwardly and engaging the one or more sidewalls, wherein a thickness of the second portion is less than a thickness of the first portion.

Aspects of the disclosure relate to a pitcher that may comprise a floatable body having a filter opening configured to receive a water filter, the floatable body having a seal extending outward from an outer surface of the floatable body, and a container having a handle and an upper opening, one or more sidewalls, and a base opposite the upper opening together defining a cavity, the container having a channel extending from the cavity proximate the base to proximate the upper opening, the channel configured to dispense water in the cavity proximate the pitcher opening when tipped, wherein the floatable body is disposed in the cavity such that the seal is configured to engage the one or more sidewalls and restrict water from passing between the floatable body and the one or more sidewalls, wherein the seal is configured to create friction with the one or more sidewalls, wherein the friction created when the floatable body rises in the container is different from the friction created when the floatable body lowers in the container.

Particular embodiments may comprise one or more of the following features. The friction created when the floatable body rises in the container may be greater than when the floatable body lowers in the container. The floatable body may be configured to auto-retract toward the base when water is dispensed from the cavity via the channel. The seal may be configured such that water can be dispensed from the cavity via the channel without burping. The seal may comprise a y-ring. The floatable body may have a downwardly extending portion configured to encapsulate a space below the filter adapter opening. The downwardly extending portion may comprise an air-filled cavity. The cavity may have a height H, and the floatable body has a height h, wherein the height h is between ¼H and ½H. A water filter may be disposed in the filter opening. The water filter may have a contoured outer surface configured to cause the water filter to twist as it is inserted into the filter opening and create a liquid seal.

BRIEF DESCRIPTION OF THE DRAWINGS

The disclosure will hereinafter be described in conjunction with the appended drawings, where like designations denote like elements.

FIG. 7 is an exploded view of third embodiment of a drinking water filter system;

FIGS. 8A and 8B are perspective views of an embodiment of a lid having a knob;

FIG. 12A is a perspective view of a second embodiment of a filter having a key channel; and FIG. 12B is perspective view of a second embodiment of a filter having a keyed feature.

FIG. 13 is a perspective view of a water pitcher having a floatable water filtering body;

FIGS. 14-19 illustrate different views of the water pitcher of FIG. 13;

FIG. 20 illustrates the floatable body at the base of the cavity immediately after unfiltered water is poured into the cavity;

FIG. 21 illustrates the floatable body as it rises in the cavity during filtering of the water;

FIG. 22 illustrates the floatable body after it rises to the top of the cavity and the unfiltered water is filtered;

FIGS. 23-25 illustrate enlarged portions of FIGS. 20-22;

FIG. 26 illustrates an exploded view of the floatable body;

FIGS. 27-30 illustrate different views of the y-ring;

FIG. 31 illustrates the pitcher when initially tipped to dispense filtered water;

FIG. 32 illustrates the pitcher as filtered water is dispensed;

FIG. 33 illustrates the pitcher after all filtered water has been dispensed, showing that the floatable body auto-retracts toward the pitcher base;

FIGS. 34-36 illustrate enlarged portions of FIGS. 31-33;

FIG. 37 illustrates the floatable body including the water filter;

FIGS. 38-44 illustrate various views of the floatable body of FIG. 37;

FIG. 47 illustrates a perspective view of the water filter; and

FIGS. 48-54 illustrate different views of the contoured water filter.

DETAILED DESCRIPTION OF THE PRESENT INVENTION

This disclosure, its aspects and implementations, are not limited to the specific components or assembly procedures disclosed herein. Many additional components and assembly procedures known in the art consistent with the intended water filter system and/or assembly procedures for a water filter system will become apparent for use with implementations of water filter systems from this disclosure. Accordingly, for example, although particular containers, seals, and filters are disclosed, such containers, seals, and filters and implementing components may comprise any shape, size, style, type, model, version, measurement, concentration, material, quantity, and/or the like as is known in the art for such water filter systems and implementing components, consistent with the intended operation of a water filter system.

Various embodiments of water filter systems contemplated as part of this disclosure are advantageous to water filter systems previously known in the art because the systems eliminate wasted space often present in conventional water filter systems. For example, conventional water filter systems include a reservoir that holds unfiltered water as it is filtered into a pitcher. When all or most of the water is unfiltered and in the unfiltered reservoir, the pitcher is empty or nearly empty, and thus wasted space. Conversely, when all or most of the water is filtered and in the pitcher, the unfiltered reservoir is empty or nearly empty, and thus wasted space. In essence, then, from 30%-50% of conventional water filter systems is empty or wasted space. This space is critical in a refrigerator or dining area. In contrast to these conventional water filter systems, various embodiments of the water filter system contemplated as part of this disclosure eliminate substantially all empty or wasted space in the system through use of a floatable seal.

Figure 1:
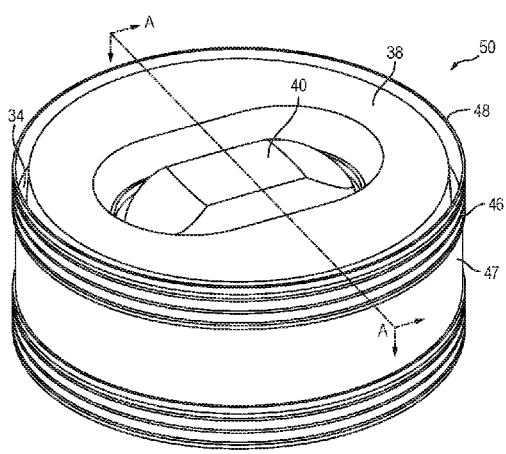
FIG. 1 is a perspective view of a first embodiment of a floatable seal and filter.

FIG. 1 depicts a non-limiting embodiment of a floatable seal 50 and filter 40. In the non-limiting embodiment depicted in FIG. 1, the filter 40 is positioned substantially central on the floatable seal 50. In other embodiments, the filter 40 may be positioned elsewhere on the floatable seal 50. In particular embodiments, due to balance concerns, it may be advantageous to position the filter in substantially the balance center of the floatable seal 50 so that it moves upward as it filters more evenly. The filter 40 is configured to filter unfiltered water positioned above, in relation to gravity, the floatable seal 50 through the filter 40 to an area below the filter 40. In one or more embodiments, no additional force beyond the force of gravity is required for the unfiltered water to pass through the filter 40. The filter 40 may comprise any filter previously known in the art and adapted to couple to the floatable seal 50. In one or more embodiments, the filter 40 comprises a charcoal filter or any other known water-filtering device. The specific type of water filter used is not critical to the embodiments illustrated herein unless otherwise indicated. More particular embodiments may comprise a filter 40 having a filth or exhaustion indicator that indicates the approximate life of the filter 40 or when the filter 40 needs replacements. According to another aspect, the filter 40 may be configured to measure and display the temperature of the water within the container.

One or more embodiments of a filter 40 may be fixedly or removably coupled to the floatable seal 50 according to various aspects of the water filtering system contemplated herein. As depicted in the non-limiting embodiment depicted in FIG. 2, the filter 40 is sized to rest upon a ledge or lip 44 on a filter opening 36 extending at least partially through the body 38 of the floatable seal 50. In this and other embodiments, the filter 40 is adapted for simple efficient removal and replacement of the filter 40 associated with the seal 50. In one or more embodiments, the filter 40 may comprise a filter ring 41 extending from the filter 40 and positioned to engage with the lip 44 on the filter opening 36. Such engagement holds the filter 40 in place and allows water to pass from above the floatable seal 50 to below the floatable seal 50 only through the filter 40.

The floatable seal 50 may comprise any shape complementary to the shape of the container 49 with which the floatable seal 50 will be utilized. In the particular non-limiting embodiment depicted in FIG. 1, the floatable seal 50 is substantially cylindrical in shape. The floatable seal 50, then, is configured for use within a substantially cylindrical container 49 such as a pitcher or cup. Pitchers are typically larger than cups. In other embodiments, the floatable seal 50 may comprise any shape complementary to the shape of the container 49 with which the floatable seal 50 is utilized, including but not limited to oval, triangular, square, or any other polygonal shape (when viewed from above or below).

Figure 2:
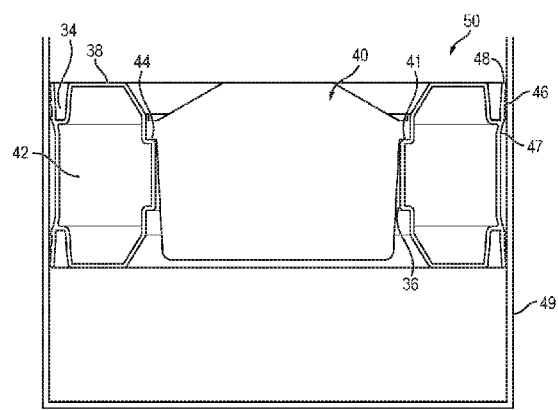
FIG. 2 is a cross-sectional view of a first embodiment of a floatable seal taken along line A-A of FIG. 1 and placed in a container.

FIG. 2 depicts a cross-sectional view of a non-limiting embodiment of a floatable seal 50 positioned within a container 49, the floatable seal 50 having a filter 40 mounted therein. In one or more embodiments, the floatable seal 50 comprises a filter body 38 comprising a filter opening 36 extending therethrough that is sized to receive the filter 40. The filter opening 36 may comprise a ring 41 or alternatively may narrow to allow mounting of the filter 40 therein.

As previously referenced, the seal typically comprises a floatable seal 50. In the non-limiting embodiment depicted in FIG. 2, the floatable seal 50 comprises a floatable body 38 housing a gas-filled annular chamber 42 therein filled with air or other gas such as, without limitation, helium, hydrogen, oxygen or nitrogen. In one or more embodiments, the annular chamber surrounds the filter opening 36 of the floatable seal 50. In other embodiments, the floatable seal 50 comprises a plurality of chambers comprising any shape that allows the floatable seal 50 to float on the filtered water after the water has passed through the filter 40. In particular embodiments, the plurality of chambers is disposed evenly around the floatable seal 50 to balance the floating characteristics of the floatable seal 50. In particular embodiments, the annular chamber 42 may comprise pressurized gas therein. In still other embodiments, a floatable material such as foam may replace or be used in combination with one or more chambers on the floatable seal 50. In particular embodiments, the chamber 42 is airtight.

As depicted in the non-limiting embodiments depicted in FIGS. 1 and 2, the floatable seal 50 may further comprise one or more sealing rings 46 extending outward from an outer surface 47 of the floatable seal 50. In particular embodiments, the floatable seal 50 comprises one more sealing rings 46 positioned on an upper portion of the outer surface 47 of the floatable seal 50 and one or more sealing rings 46 positioned on a lower portion of the outer surface 47 of the floatable seal 50. Even more particularly, the one or more rings may be positioned on an annular arm 48 extending from the floatable seal 50. In some embodiments, an annular arm 48 extends angularly from the body 38 of the floatable seal, a channel 34 being formed between the annular arm 48 and the body 38 of the floatable seal 50. According to one aspect, the floatable seal 50 comprises an upper annular arm 48 and a lower annular arm 48, each annular arm 48 comprising one or more sealing rings 46. According to other aspects, the floatable seal 50 comprises only one of the upper or lower annular arms 48. In one or more embodiments, an annular arm 48 is biased away from the floatable seal 50. The one or more arms 48 and/or the rings 46 are configured and positioned on the floatable seal 50 to restrict unfiltered water held above the floatable seal 50 from passing between the floatable seal 50 and the wall of the container 49 into the area of the container below the seal.

As depicted in FIG. 2, the container 49 typically comprises a shape complimentary to the shape of the floatable seal 50. For example, in the non-limiting embodiment depicted in FIG. 2, both the container 49 and the outer boundary of the seal are substantially cylindrical in shape. In other embodiments, the container 49 may comprise any shape complementary to the shape of the floatable seal 50 such that the floatable seal 50 is slidable within the wall or walls of the container 49 and still restricts or in some cases prevents passage of water between the floatable seal and the wall or walls of the container 49. The container 49 is likewise sized to allow sliding of the floatable seal 50 within the container 49 and maintaining the floatable seal 50 between the floatable seal 50 and the wall or walls of the container 49. Typically, the walls of the container 49 are substantially vertical or perpendicular to the base of the container 49. Thus, the portion of the container 49 that interfaces with the floatable seal 50 comprises a uniform diameter or width that allows for the combination sliding and sealing features described above. According to some aspects, the cylindrical nature of the floatable seal 50 and/or the annular arms 48 of the floatable seal 50 discourage the floatable seal 50 from tipping once the floatable seal 50 is within the container 49.

The floatable seal 50 may be made of any of a variety of materials. In one or more embodiments, the floatable seal 50 comprises a plastic seal. More particularly, the floatable seal 50 comprises plastic pieces sonically welded, adhesively glued, compression fit or otherwise coupled to one another. In particular, non-limiting embodiments, the floatable seal 50 or any floatable seal disclosed herein may comprise polypropylene, as well as a float overmold comprising a thermoplastic elastomer (TPE) or GLS Versaflex™ CL. The annular arm 48 and/or sealing rings 46 may likewise be plastic or, alternatively, a rubber material. In still other embodiments, the floatable seal 50 comprises a rubber or silicon seal. The container 49 of this embodiment or any other containers, pitchers, cups, and the like disclosed herein may be made of any of a variety of materials known in the art, such as but not limited to plastic, metal, wood, glass, rubber, polycarbonate, clear acrylic, and the like. Any of the containers disclosed herein may further comprise a pitcher overmold comprising TPE and/or GLS Versaflex™ OM. In one or more embodiments, the container comprises a spout or straw extending outward from the base of the container 49. Alternatively, the container 49 may comprise an opening at the base of the container 49 configured to receive a straw or spout. The container 49 may further comprise a plug that plugs the spout or straw during filtration. Through the inclusion of a spout or straw opening from the base of the container 49, the filtered water may be poured or sucked out of the container 49 while unfiltered water is still passing through the filter 40.

In operation, a method of filtering water may utilize embodiments of the floatable seal 50 and container 49 disclosed herein. The floatable seal 50 is typically placed into the container 49. The filter 40 may be mounted or coupled to the floatable seal 50 prior to placing the floatable seal 50 in the container 49 or after placing the floatable seal 50 in the container 49. The floatable seal 50 may be placed on the bottom of the container 49 when it is empty or, alternatively, placed on filtered water already present in the container 49. The floatable seal 50 is positioned such that a seal is formed between the walls of the container 49 and the floatable seal 50. In such positioning, typically the only fluid communication between the area above the floatable seal 50 and the area below the floatable seal 50 is through the filter 40.

Once the floatable seal 50 is positioned appropriately in the container 49, unfiltered water is poured into the container. The floatable seal 50 may be positioned approximately 0.25-1.0 inches above the bottom base of the container 49 in particular implementations to provide additional space for the initial filtered water to filter prior to the filtered water starting to float the seal. In some embodiments, a spacer component may be coupled to or integrated into the design of the floatable seal 50 to establish the gap between the floatable seal 50 and the bottom surface of the base inside of the container 50. In yet other embodiments, as illustrated in the structure of the floatable seal 50 in FIG. 2, the floatable seal 50 may be placed adjacent to the bottom surface of the base inside of the container 49 and a gap between the filter 40 and the bottom of the body 38 floatable seal 50 allows filtered water to start to float the floatable seal 50.

The floatable seal 50 and filter hold the unfiltered water in the unfiltered chamber or area above the floatable seal 50 as the unfiltered water passes through the filter 40. Water passes from the area above the filter 40 to the area below the floatable seal 50 only through the filter 40, and not between the floatable seal 50 and walls of the container 49. As the water passes through the filter 40, the floatable seal 50 floats on the filtered water below the floatable seal 50 and is biased through the water above it to float above that water too, thus increasing the volume of the area below the floatable seal 50 and decreasing the volume of the area above the floatable seal 50. Once all the water above the floatable seal 50 has passed through the floatable seal 50, the floatable seal 50 and filter 40 may be removed from the container 49. In other embodiments, a spout may be included within the container 49 extending from the bottom of the container 49 so that water may be poured from the container 49 without removal of the floatable seal 50 and filter 40.

Figure 3:
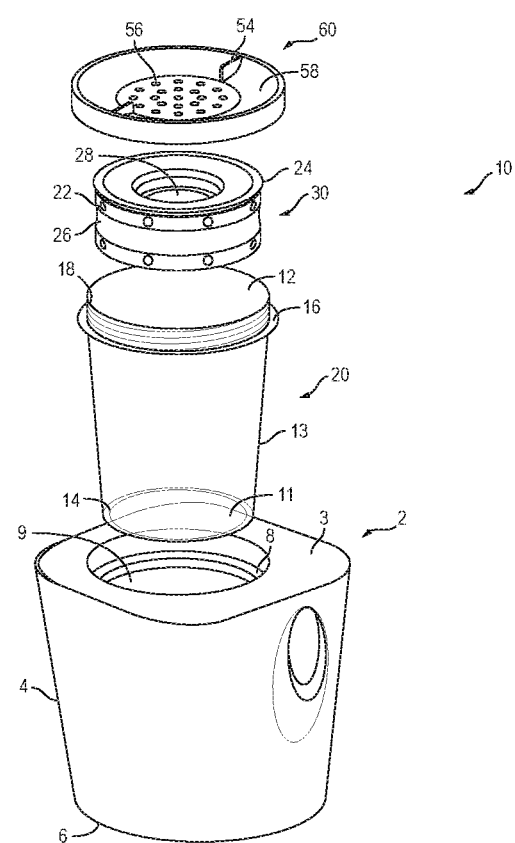
FIG. 3 is an exploded view of a second embodiment of a drinking water filter system.

According to some aspects, a water filter system may be further configured to comprise a filter sleeve 20 in addition to a floatable seal 30 and filter 40. In particular, FIG. 3 depicts an exploded view of a non-limiting embodiment of a water filter system 10 comprising a pitcher 2, a filter sleeve 20, a floatable seal 30, and a lid 60. The floatable seal 30 and filter 40 may comprise any of the floatable seals and filters and their characteristics and alternatives as described elsewhere in this document.

The pitcher 2 may comprise any container known in the art or described elsewhere in this document and adapted for use with a filter sleeve 20. In one or more embodiments, the pitcher 2 comprises one or more walls 4 forming a chamber 7 sized to house the filter sleeve 20 therein, a base 6, and a sleeve opening 9 distal the base 6. The sleeve opening 9 is sized and configured to allow at least a portion of the filter sleeve 20 to pass through the sleeve opening 9. According to some aspects, the pitcher 2 is configured to allow mounting of the filter sleeve 20 thereto. The sleeve opening 9 is typically bordered by the rim 8 that interfaces with mounting lip 16 on the filter sleeve 20 to mount the filter sleeve 20 within the sleeve opening 9. More particularly, the pitcher 2 may comprise a rim 8 proximate the filter opening 9. According to some aspects, the rim 8 is formed integral with a pitcher lid 3. The pitcher lid 3 may be integral with the walls 4 of the pitcher 2 or, alternatively, may be removably coupled to the wall 4 opposite the base 6. Additional threading or locking tabs may border the sleeve opening 9 for removable coupling of filter sleeve 20 to the pitcher lid 3. The pitcher may further comprise a spout opening extending at least partially through the pitcher lid 3. In still other embodiments, the rim 8 may be formed without a pitcher lid 3.

Figure 4:
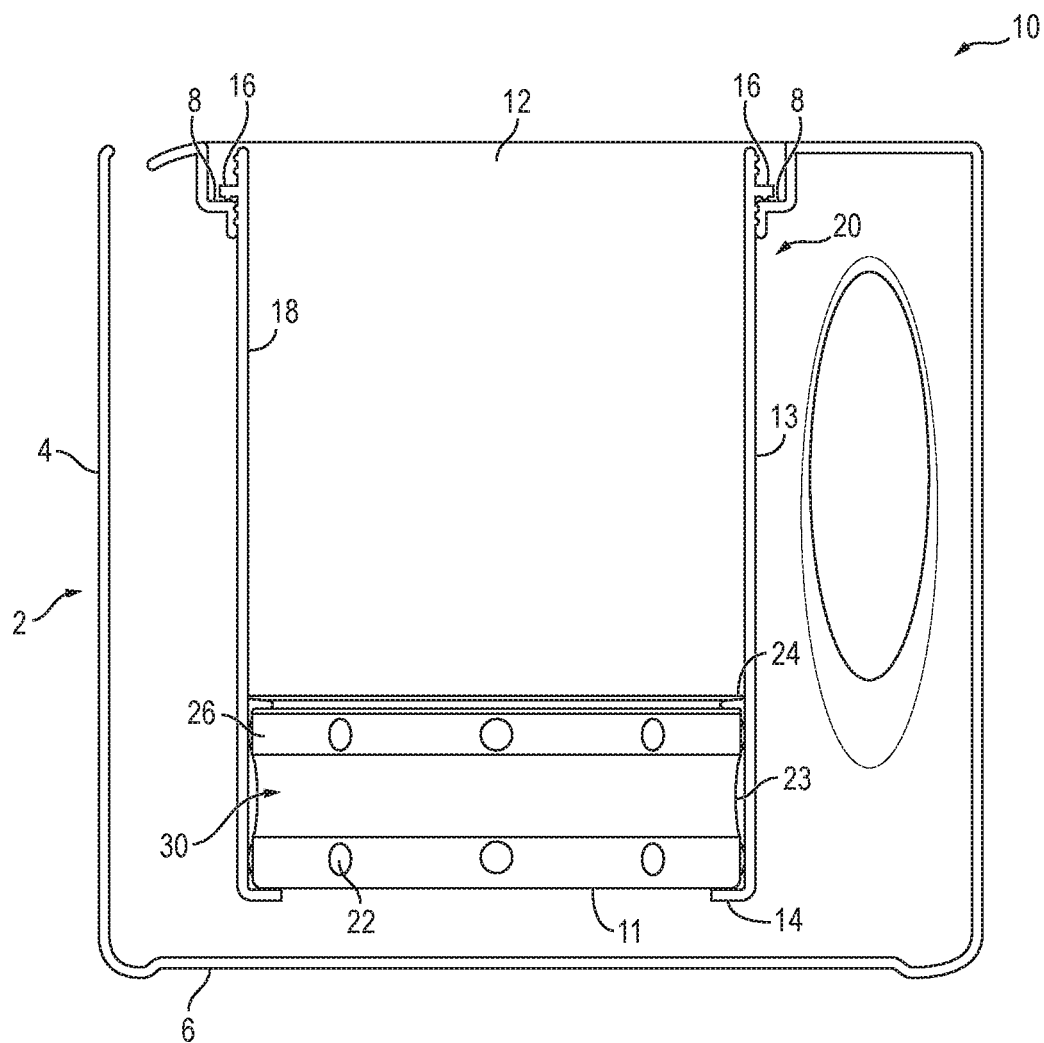
FIG. 4 is a partial cross-sectional view of a second embodiment of a drinking water filter system.

FIGS. 3 and 4 also depict a non-limiting embodiment of a filter sleeve 20. The filter sleeve 20 typically comprises a hollow sleeve with a first or bottom open end 11 and a second or top open end 12 opposite the first open end 11 and in fluid communication with the first open end 11. The filter sleeve 20 may comprise a variety of shapes formed by one or more walls 13 of the filter sleeve 20, such as but not limited to a cylindrical sleeve as depicted in FIGS. 3 and 4. In other embodiments, the cross-sectional shape of a filter sleeve may comprise an oval, a triangle, a rectangle, a square, a pentagon, and so on. The filter sleeve 20 is typically shaped complementary to the shape of the sleeve opening 3 in the pitcher 2. In one or more embodiments, the inner surface 18 of the walls 13 of the filter sleeve comprise zero-draft walls.

As noted above, one aspect of a filter sleeve 20 comprises a mounting lip 16 proximate a second or top end 12 of the of the filter sleeve 20. The mounting lip 16 is positioned on the filter sleeve 20 such that when the mounting lip 16 is interfacing or engaging with the rim 8 of the pitcher 2, the bottom or first end 11 of the filter sleeve 20 is not in direct contact with the base 6 of the pitcher 2. That is, a space exists between the bottom end 11 of the filter sleeve 20 and the base 6 of the pitcher when the mounting lip 16 is engaged with the rim 8 of the pitcher 2 or otherwise removably coupled to the pitcher lid 3. The mounting lip 16 may extend outward from the outer surface of the one or more walls 13 of the filter sleeve 20 and may surround the entire outer surface of the filter sleeve 20. In other embodiments, the mounting lip 16 comprises a plurality of mounting lips extending outward from the outer surface of the wall 13 of the filter sleeve 20 to hold the filter sleeve 20 suspended within the pitcher 2. The mounting lip 16 is typically sized and positioned to interface with the rim 8 of the pitcher 2. In some embodiments, the filter sleeve 20 may comprise threading or tabs for engaging with threading or tabs on the pitcher lid 3. The mounting lip 16 itself may engage with tabs or threading on the pitcher lid 3.

One or more embodiments of a filter sleeve 20 further comprise sleeve threading or tabs proximate the top end of the sleeve. The threading or tabs proximate the top end 12 of the filter sleeve 20 are typically configured to engage with threading or tabs on the sleeve lid 60 for removable coupling of the sleeve lid 60 to the filter sleeve 20. According to one aspect, the threading or tabs of the filter sleeve 20 are positioned between the top end 12 of the filter sleeve 20 and the mounting lip 16 of the filter sleeve 20.

One or more embodiments of a filter sleeve 20 further comprise a stop lip 14 proximate a first or bottom end 11 of the filter sleeve 20. FIG. 4 depicts a cross-sectional view of a non-limiting embodiment of water filter system 10, including a filter sleeve 20 comprising a stop lip 14. According to some aspects, the stop lip 14 extends inward from an inner surface 18 of the one or more walls 13 of the filter sleeve 20. The stop lip 14 is sized to engage with the floatable seal 30 and restrict the floatable seal 30 from sliding from the filter sleeve 20 into the pitcher 2.

The inner surface 18 of the wall(s) 13 of the filter sleeve 20 are typically smooth between the top end 12 and the stop lip 14 of the filter sleeve 20 to allow sliding of the floatable seal 30 between the top end 12 and the bottom end 11 of the filter sleeve 20. In one or more embodiments, the inner surface 18 of the filter sleeve 20 may comprise tracks configured to align with slots on the floatable seal 30. The filter sleeve 20 and the water pitcher 2 are formed separately and later assembled.

Figures 5, 6:
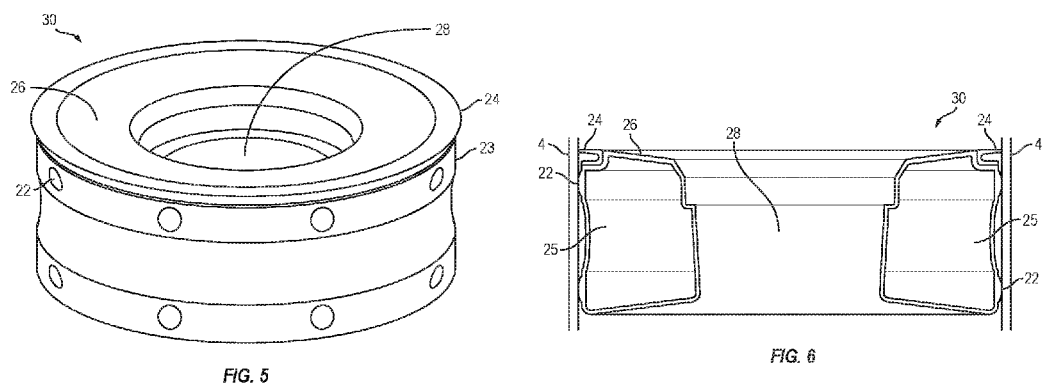
FIG. 5 is a perspective view of a second embodiment of a floatable seal.
FIG. 6 is a cross-sectional view of a floatable seal taken along line B-B in FIG. 5 and positioned within a filter sleeve.

FIGS. 5 and 6 depict a non-limiting embodiment of a floatable seal 30. The floatable seal 30 is configured to slide within the filter sleeve 20 between the top end 12 and the bottom end 11. More particularly, the floatable seal 30 is configured to float on water within the pitcher 2 and rise within the filter sleeve 20 above the bottom end 11 of the filter sleeve 20 when the water level within the pitcher 2 is above the bottom end 11 of the filter sleeve 20. The floatable seal 30 is also configured to removably couple or mount to a water filter 40. When a water filter 40 is mounted to the floatable seal 30, the floatable seal 30 is positioned within the filter sleeve 20, and water is held within the filter sleeve 20 above the floatable seal 30, the floatable seal 30 is configured to restrict water from passing between the outer surface 23 of the floatable seal 30 and the inner surface 18 of the walls 13 of the filter sleeve 20. Instead, the floatable seal 30 is configured to allow water to only pass from the filter sleeve 20 to the pitcher 2 through the water filter 40.

The floatable seal 30 is typically shaped complimentary to the shape of the filter sleeve 20. For example, in the non-limiting embodiment depicted in FIGS. 3 and 4, the floatable seal 30 is substantially cylindrical in shape to complement the cylindrical channel of the filter sleeve 20. In one or more embodiments, the floatable seal 30 comprises a plurality of balance tabs 22 positioned on an outer surface 23 of the floatable seal 30. The plurality of balance tabs 22 are sized to interface with the inner surface 18 of the wall 13 of the filter sleeve 20. The balance tabs 22 discourage the floatable seal from tipping or wobbling within the filter sleeve 20, while also decreasing the amount of surface area of the floatable seal 30 in contact with an inner surface 18 of the filter sleeve 20. Decreasing the surface area in contact with the inner surface 18 of the filter sleeve 20 reduces the friction between the floatable filter 30 and the filter sleeve 20, thus allowing for easier sliding motion of the floatable filter 30 within the filter sleeve 20. The floatable seal 30 may further comprise a concave portion between the top and bottom of the floatable seal 30, for example and without limitation, as illustrated in FIGS. 5 and 6.

The floatable seal typically further comprises a sealing ring 24 sized and positioned to interface with the inner surface 18 of the wall 13 of the filter sleeve 20. In the non-limiting embodiment shown in FIGS. 5 and 6, the sealing ring 24 is proximate a top of the floatable seal. In other embodiments, the sealing ring 24 may be positioned elsewhere on the floatable seal 30, such as but not limited to a bottom portion or a central portion. FIG. 6 depicts a cross-sectional view of a floatable seal 30 having a sealing ring 24. According to some aspects, the sealing ring 24 comprises a rubber seal either fixedly or removably coupled to the floatable seal 30. In some embodiments, the sealing ring 24 is over-molded to the floatable seal 30. The sealing ring 24 is configured to restrict water from passing between the outer surface 23 of the floatable seal 30 and the inner surface 18 of the wall 13 of the filter sleeve 20. The sealing ring 24 is also configured to allow the floatable seal 30 to slide within the filter sleeve 20 while simultaneously restricting the passage of water between the outer surface 23 of the floatable seal 30 and the inner surface 18 of the walls 13 of the filter sleeve 20. According to some aspects, the floatable seal comprises a plurality of sealing rings 24. The sealing ring 24 may comprise a rubber, plastic, or any other suitable material.

Aspects of the floatable seal 30 may further comprise any of the other elements of a floatable seal described elsewhere in this document relating to other embodiments of a floatable seal. For example, the floatable seal 30 may comprise a filter opening 28 and ledge or lip for coupling and mounting of the filter 40 to the filter opening 28. According to some aspects, the floatable seal 30 may comprise an over-molded seal positioned on the lip around the filter opening 28. The over-molded seal is configured to restrict water from seeping between the filter 40 and the floatable seal 30. In other aspects, the filter 40 may be threadedly coupled to the floatable seal 30. In still other embodiments, the floatable seal 30 may comprise a textured, ribbed, or other non-planar surface, particularly at the lip adjacent the filter opening 28. The filter 30 may comprise complementary texturing, ribbing, or other non-planar surfacing to form a seal between the filter 40 and the floatable seal. In these or other embodiments, the filter 40 may snap-fit to the floatable seal 30.

Additionally, as the floatable seal 30 is configured to float on water, the floatable seal 30 may comprise any of the configurations or materials described elsewhere in this document that allow the floatable seal to float on water, such as but not limited to a gas-filled chamber 25. In any of the embodiments described herein, the floatable seal 30 may be configured such that the filter 40 is offset or not planar with the bottom of the floatable seal 30. In this way, the filter 40 stays out of the filtered water below the floatable seal 30.

In operation, the floatable seal 30 and filter 40 may rest anywhere within the filter sleeve 20 when no water is held within the filter sleeve 20 above the floatable seal 30 and filter 40. According to some embodiments, the floatable seal 30 and filter 40 rest on either the water within the pitcher 2 or the stop lip 14, whichever is lower, when no water is held within the filter sleeve 20 above the floatable seal 30 and filter 40. As water is added to the filter sleeve 20 above the floatable seal 30 and filter 40, water begins to pass from the filter sleeve 20 to the pitcher 2 only through the filter 40. As water passes from the filter sleeve 20 to the container through the filter 40, the water level within the pitcher 2 rises and the floatable seal 30 floats on the water within the pitcher 2 and filter sleeve 20. Thus, the floatable seal 30 rises within the filter sleeve 20 as the water in the pitcher 2 rises.

Embodiments of the floatable seal systems contemplated as part of this disclosure are configured to filter water at various rates. For example, some of the filters 40 are configured to filter approximately ½ to approximately 3 cups of water per minute. More particularly, some of the filters 40 are configured to filter approximately 1 to 3 cups of water per minute. Even more particularly, some of the filters 40 are configured to filter approximately 1 cup of water per minute.

As depicted in the non-limiting embodiment of FIG. 3, various embodiments of a water filter system further comprise a sleeve lid 60. The sleeve lid 60 is typically configured to removably couple to either the container lid 3 or the filter sleeve 20. In the non-limiting embodiment of FIG. 3, the sleeve lid 60 is configured to removably and threadedly couple to the filter sleeve 20. According to some embodiments, the filter sleeve 20 further comprises one or more openings 56 and a funnel-shaped portion 58 that allow a user to insert water into the filter sleeve 20 without removing the sleeve lid 60. The one or more openings may covered by a biased flap, as depicted in the non-limiting embodiment of FIG. 10.

FIG. 7 depicts other non-limiting embodiments of a sleeve lid 62, floatable seal 30, and a filter sleeve 64. While in the non-limiting embodiment of FIG. 3 the sleeve lid 60 threadedly couples with an outer surface of the filter sleeve 20, in the non-limiting embodiment of FIG. 5, the sleeve lid 62 is configured to threadedly couple to the interior surface 65 of the filter sleeve 64. For example, the floatable seal 30 may be inserted into the filter sleeve 64, and then a threaded portion 78 at an open first or top end 74 of the lid 62 may be threadedly coupled to a threaded portion 76 on the interior surface 65 of the filter sleeve 64.

Some embodiments, such as the embodiment depicted in FIG. 7, comprise a filter sleeve 64 configured to removably couple to another apparatus, such as but not limited to a water bowl for a pet. For example, an open second or bottom end 72 of the filter sleeve 64 may removably couple to a pet dish. In operation, the floatable seal 30 and filter sleeve 64 may be configured similar to and work similar to those described elsewhere in this document.

According to some embodiments, a sleeve lid comprises a funnel shaped portion and a plurality of small holes at the base of the funnel shaped portion. This configuration allow for water to be more easily inserted into the filter sleeve. According to some aspects, the center portion of the filter cap is movable between to positions to either open or close the plurality of small holes. FIGS. 8A and 8B depict another non-limiting embodiment of a sleeve lid 80. In this particular embodiment, the sleeve lid 80 comprises a funnel-shaped portion 86. This particular embodiment further comprises a knob 82 on the sleeve lid 80 that is movable between two positions. When the knob 82 is pulled up to a first position (shown in FIG. 8A), water is allowed to pass through the sleeve lid 80. When the knob 82 is pushed down to a second position (shown in FIG. 8B), water is restricted from passing through the sleeve lid 80. When the knob 82 is pushed down and the rotated, the sleeve lid 80 may be removed. The sleeve lid 80 may be adapted for use with any of the water filter systems described in this document.

Figure 9A:
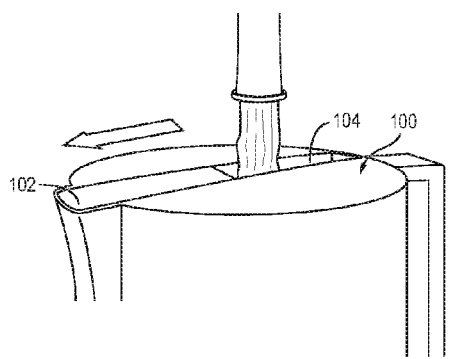
FIGS. 9A and 9B are perspective views of an embodiment of a lid having a slider piece.
Figure 9B:
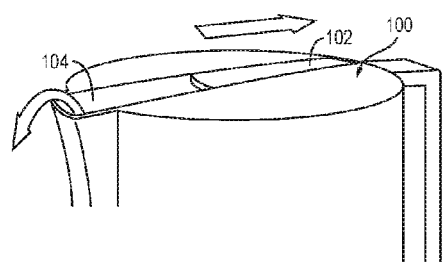

FIGS. 9A and 9B depict another non-limiting embodiment of a sleeve lid 100. In this particular embodiment, the sleeve lid 100 comprises a slider piece 102. The slider piece 102 is configured to cover the spout of the pitcher when the opening 104 on the sleeve lid 100 is uncovered to allow unfiltered water to enter the filter sleeve 20. When the slider piece 102 is slide to cover the opening 104, the spout is uncovered to allow filtered water to be poured from the container to a cup through the spout. The sleeve lid 100 may further comprise a depression that may be used to rotate the sleeve lid 100 from a locked to an unlocked position. The sleeve lid 100 may be adapted for use with any of the water filter systems described in this document.

Figure 10A:
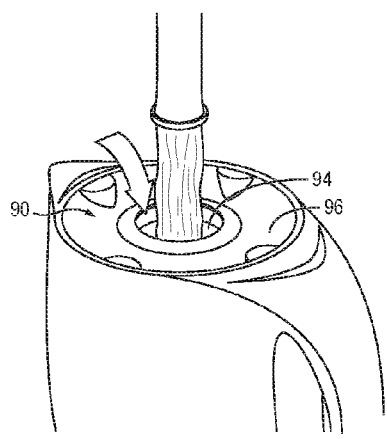
FIGS. 10A and 10B are perspective views of an embodiment of a lid having a biased flap.
Figure 10B:
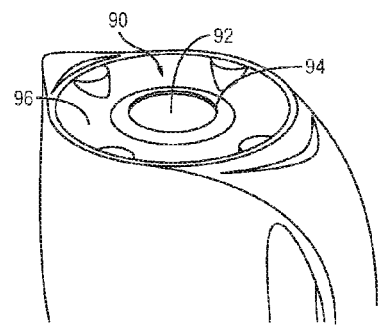

FIGS. 10A and 10B depict another non-limiting embodiment of a sleeve lid 90. In this non-limiting embodiment, the filter lid 90 comprises a funnel shaped portion 96. At the base of the funnel shaped portion 96 is a biased flap 92. The biased flap 92 closes an opening 94 in the filter lid 90 unless a force is exerted on the biased flap 92. When water from a faucet comes in contact with the biased flap 92, the force is typically strong enough to push the biased flap 92 down to uncover the opening 94 and allow water to enter the filter sleeve 20. The filter lid 90 may further comprise raised nubs to allow a user to screw on and off the lid 90. The sleeve lid 90 may be adapted for use with any of the water filter systems described in this document.

Figure 11A:
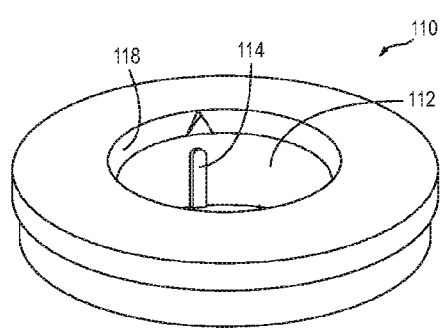
FIG. 11A is a perspective view of a first embodiment of a floatable seal having a keyed feature.
Figure 11B:
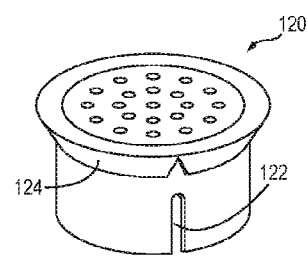
FIG. 11B is a perspective view of a first embodiment of a filter having a key channel.

FIGS. 11A and 11 B depict a non-limiting embodiment of a floatable seal 110 and filter 120 according to one aspect of a water filter system. In one or more embodiments, a floatable seal 110 comprises a protruding tab 114 on the filter opening 112 that acts as a key to properly align with and lock the filter 120 into place. The filter 120 may comprise complementary positioned slots 122 sized to engage with the protruding tabs 114 on the filter opening 112. According to some aspects, the floatable seal 110 further comprises an angled edge 118 surrounding the filter opening 112. In such embodiment, the filter 120 typically includes an angled edge 124 complementary to the angled edge 118 of the floatable filter 110 such that the two angled edges 118, 124 interface with one another with the filter 120 is mounted to the floatable seal 110. The floatable seal 110 may comprise aspects of any other floatable seals disclosed herein. The floatable seal 110 and filter 120 may be adapted for use with any water filter systems contemplated in this disclosure.

FIGS. 12A and 12B depict additional non-limiting embodiments of a floatable seal 140 and a filter 130. According to some aspects, the floatable seal 140 comprises a protruding tab 134 extending into the filter opening 142 and the filter 130 comprises a slot 132. The slot 132 is configured such that the filter 130 is locked in to place by aligning the slot 132 with the protruding tab 134, pressing down, and then rotating the filter 130. The floatable seal 140 may comprise aspects of any other floatable seals disclosed herein. The floatable seal 140 and filter 130 may be adapted for use with any water filter systems contemplated in this disclosure.

Referring now to FIG. 13, there is shown a perspective view of another exemplary embodiment of a portable water filtration system generally shown as water pitcher 200. A top view of pitcher 200 is shown in FIG. 14, a front view in FIG. 15, a side view in FIG. 16, an end view in FIG. 17 and another side view in FIG. 18. Pitcher 200 is seen to comprise a water container 202 formed by a generally cylindrical sidewall 204 and a base 206 together forming a cavity 208 therein as shown in FIG. 19 with the lid 212 removed. The pitcher has a handle 210 and a pivotable lid 212. A fill opening 214 is formed in the lid 212 and is shown to comprise a deflectable flap 216 disposed over the opening 214. The flap 216 is configured to selectively allow water to be poured through opening 214 to fill the pitcher 200 with unfiltered water and prevent splashing of the filtered water out of the container. The pitcher has a spout 218 at an upper portion of the sidewall 204 proximate an upper rim 220 of the pitcher. The spout 218 is configured to dispense filtered water via a channel 222 formed in the sidewall 204 inside cavity 208 as shown in FIG. 20, the channel 222 extending from the upper rim 220 to the cavity 208 proximate the base 206 of the pitcher 200. Although the non-limiting pitcher example illustrated in FIGS. 13-19 includes a generally cylindrical sidewall, it should be understood that other sidewall shapes may alternatively be used provided a correspondingly shaped floatable body is used. For example, it is specifically contemplated that instead of a circular cross-section of the cylindrical sidewall, an oval cross-section, an elliptical cross-section, an arch-shaped cross-section, or square or rectangular cross-section may be used.

Referring now to FIGS. 20, 21 and 22, there are shown cross sectional views of the pitcher 200 taken along a cross section A-A as shown in FIG. 17 for various levels of filtered water within the pitcher 200. FIG. 20 shows a floatable body 230 comprising a housing 231 including a centrally located filter adapter opening 232 receiving an interchangeable water filter 234. The floatable body 230 resides at the bottom of the cavity 208 when there is no water in the cavity 208, and when unfiltered water is initially poured into the pitcher 200. The floatable body 231 member has a generally annular shape, like a donut, having a gas-filled cavity 236 providing buoyancy to the floatable body 230.

FIG. 21 illustrates the floatable body 230 at a midsection of cavity 208 as gravity causes water to filter from an upper portion 238 of cavity 208 holding unfiltered water to a lower portion 240 of the cavity 208 holding filtered water. The floatable body 230 rises in the cavity 208 as the amount of filtered water in lower portion 240 increases and the amount of unfiltered water in the upper portion 238 decreases.

FIG. 22 illustrates the floatable body 230 at the top of the cavity 208 when unfiltered water in the upper portion 238 has completely filtered into the lower portion 240. FIGS. 20-22 illustrate the water level of filtered water in the channel 222 during the filtering process.

An annular seal 250 is disposed about a periphery of floatable body member 231, and provides a liquid seal between the floatable body member 231 and an inner wall 252 of the sidewall 204 in all positions of the floatable body 230. In an alternative embodiment, the seal 250 may be over molded on the floatable body 230, and would have an acceptable durometer range. An acceptable durometer range includes a durometer measurement of between 30 and 90. In particular embodiments, a durometer measurement of 50 to 70 was determined acceptable, and an optimal durometer measurement of 55 to 65, and in particular embodiments a durometer measurement of 60 has been determined to be critical for the materials used. FIG. 23 illustrates an enlarged view of a non-limiting embodiment of the seal and its engagement with inner wall interface at section A of FIG. 20. Advantageously, the seal 250 creates friction with the inner wall 252 that is greater when the floatable body 230 rises in cavity 208, and which friction is less when the floatable body 230 is lowered in the cavity 208, such as during initial insertion into an empty pitcher 200, and also when the floatable body 230 auto-retracts toward bottom 206 during dispensing of filtered water via the channel 222 and spout 208 when tipped, as shown in FIGS. 31, 32, and 33. In some embodiments, the friction generated as the floatable body 230 rises is at least two times the friction generated as the floatable body 230 lowers. In other embodiments, the friction generated during rising is up to six (6) times the friction generated during the lowering of the floatable body 230.

In one exemplary embodiment, the seal 250 is comprised of an annular y-ring or a u-ring, both shapes also referred to herein as a y-seal, as shown in FIG. 26 through FIG. 32. The y-seal 250 has an upwardly extending distal tapered tip 254 that is biased outwardly against the inner wall 252 when the floatable body 230 is initially disposed in the cavity 208 of pitcher 200 to provide a liquid seal. The y-seal 250 is resiliently biased outward to a rest position wherein the tapered tip 254 extending outward of the radius of the floatable body 230. By having its rest position with the tapered tip 254 extending outward of the radius of the floatable body, but the remainder of the y-seal 250 recessed into a side of the floatable body 230, the tapered tip 254 exerts pressure against the inner wall of the pitcher to create a seal to resist against unfiltered water passing the floatable body 230 except through the filter 234. This configuration also provides a more consistent friction force against the inner wall 252 to adapt for inconsistencies in the topography of the inner wall 252 surface, and even for angled inner wall 252 surfaces becoming wider between the bottom of the pitcher 206 and the top of the pitcher. As shown in FIG. 23, the tip 254 extends generally horizontal from an upwardly extending portion 256 of seal 250, and is distended slightly upwardly and engages the inner wall 252. The seal 250 has a narrowed web portion 258 that allows the seal tip 254 to bend thereat and facilitate being distended upwardly and downwardly. The seal 250 has an upwardly extending portion 260 that is parallel to, and thicker than, the portion 256 and also has a midsection 262 bridging the portion 256 to the portion 260. The seal 250 is configured to be securely disposed in an annular recess 270 of floatable body member 231, as shown in FIG. 26. By using a y-shaped seal as opposed to a common round seal, the friction force In one exemplary embodiment, the bottom side 300 (FIG. 24) of the floatable body is open and not enclosed by a bottom member. This configuration with floatable body 230 sides and top and filter adapter opening 232 still includes the chamber 236 within the side wall(s) of the floatable body 230 so that the gas is trapped below the top surface of the floatable body 230 to create buoyancy, but the bottom side 300 is removed to leave it open. This may simplify manufacture of the floatable body 230 in some instances, and reduce the weight of the floatable body. Although the particular embodiments illustrated in the various figures included in this disclosure each show a bottom side of the various embodiments, it should be understood that this bottom side is optional for particular embodiments and that the Figures should be understood to represent the floatable body both with and without the bottom side as any of the embodiments may be manufactured without the bottom side of the floatable body.

FIG. 24 shows an enlarged view of section B of FIG. 21, illustrating the tip 254 distended slightly downward as the floatable body 230 floats upwardly. FIG. 25 shows an enlarged view of section C of FIG. 22, which also shows the tip 254 distended slightly downward as the floatable body 230 floats upwardly. When the tip 254 is distended slightly downward, the friction created between the tip 254 and the inner wall 252 is greater than when the tip 254 is distended slightly upward, as previously discussed.

FIG. 26 shows an exploded view of the seal 250 and the floatable body member 231. Annular recess 270 is defined in the upper portion of the member 231 having an annular upper lip 272 and accommodates the y-seal 250. The recess 270 may have a variety of shapes. The width of the recess 270 is the same as the width of the seal 250, as shown in FIG. 23, and is held in place in a friction fit arrangement. FIG. 27 shows a side view of the seal 250, FIG. 28 shows a top view of the seal 250, FIG. 29 shows a bottom view of seal 250, and FIG. 30 shows a cross-sectional view of seal 250 taken along B-B in FIG. 27.

Referring to FIGS. 31, 32 and 33, there is shown the dispensing of filtered water from the lower portion 240 of cavity 208 via channel 222 and spout 218. FIG. 31 illustrates pitcher 200 full of filtered water where the floatable body 230 is at the top of the cavity 208, as shown in FIG. 22. As shown in FIG. 32, as the filtered water dispenses from the pitcher 200, the sealed lower portion 240 of cavity 208 creates a vacuum suction such that the floatable body 230 auto-retracts toward the bottom 206 of the pitcher 200. Advantageously, the lower friction arrangement of the y-seal 250 with the inner wall 252 allows the floatable body 230 to smoothly and quickly retract, allowing a significant pour rate, and also without any burping of air bubbles. The floatable body 230 is also configured to quickly auto-retract to the bottom of the pitcher so that the pitcher can quickly and effortlessly be filled again. It is important that a liquid seal is maintained to separate unfiltered water from the filtered water in all positions, during filling and during dispensing, even when tipped which can cause uneven forces. The varying friction arrangement of y-seal 250 solves this design consideration. FIG. 34 shows an enlarged view D shown in FIG. 31, where the y-seal 250 with tip 254 distended slightly downward and creating a larger friction. As the pitcher 200 is tipped, the seal 250 switches to being distended slightly upward, as shown in FIG. 35 showing an enlarged view E shown in FIG. 32. When the filtered water is completely dispensed from the cavity 208, the seal 250 remains being distended slightly upward, as shown in FIG. 36 showing enlarged view F shown in FIG. 33.

Referring to FIG. 37, there is shown a perspective view of floatable body 230 comprising floatable body member 231 securingly receiving the water filter 234 and forming a liquid seal. Filter 234 can include any commercial filtration media. FIG. 38 illustrates a front side view of the floatable body 230, FIG. 39 illustrates a left side view of the floatable body 230, FIG. 40 illustrates a right side view of the floatable body 230, FIG. 41 illustrates a back side view of the floatable body 230, FIG. 42 illustrates a top view of the floatable body 230, and FIG. 43 illustrates a bottom view of the floatable body 230. FIG. 44 illustrates a cross-sectional view of floatable body 230 taken along lines C-C as shown in FIG. 38. As shown in FIG. 43, a bottom 280 of filter 234 has a plurality of openings 282 allowing filtered water to pass into the bottom portion 240 of the cavity 208. A bottom 284 of the floatable body member 231 has one more recesses, shown as four radially extending recesses 286 extending from the filter bottom 280 to a periphery of the floatable body member 231. The recesses 286 provide fluid paths from the openings 282 underneath the floatable body member 231 and along the pitcher bottom 206 to reduce suction when the floatable body member 231 rests on the pitcher bottom 206. In embodiments where the bottom side 284 of the floatable body is not included, as discussed previously, the channel 286 may be represented as a recess in the side wall of the floatable body member 23 at the edge of the floatable body member 231 as illustrated in FIGS. 38-41, the remaining surrounding edge providing a stand-off from the bottom of the bottom of the pitcher when the floatable body 230 is positioned at the bottom of the pitcher. The channel 286 would also be reflected in its extending through the sides of the bottom of the filter adapter opening 232. By including raised portions along the bottom edges of the floatable body 230, there is not any continuous surface that sits on the bottom of the pitcher to create a vacuum or a pressure-lock. The water can thereby flow more freely and the floatable member 230 can move more readily without the additional complications of nowhere for the initial water to flow when it seeps through the filter 234. In the embodiment of FIG. 43, this configuration would result in four stand-off legs around the bottom edge of the floatable body member 231 and four stand-off legs around the bottom edge of the filter adapter opening, each leg separated from the others by a gap or channel therebetween. Any number, one or more, of stand-off legs may be used, having at least one gap therebetween to reduce the likelihood of a vacuum or pressure lock being formed on the bottom of the floatable body 230 when immediately adjacent to the bottom of the pitcher.

Figure 46:
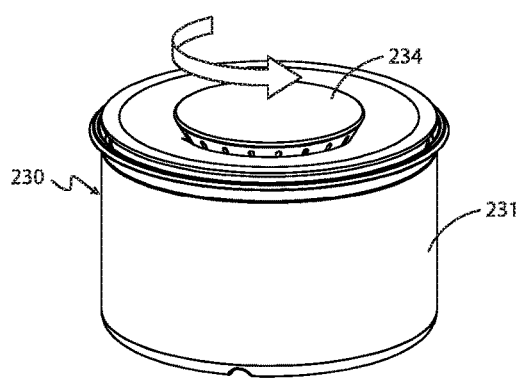
FIG. 46 illustrates the insertion of the water filter by rotation into the floatable body member.
Figure 45:
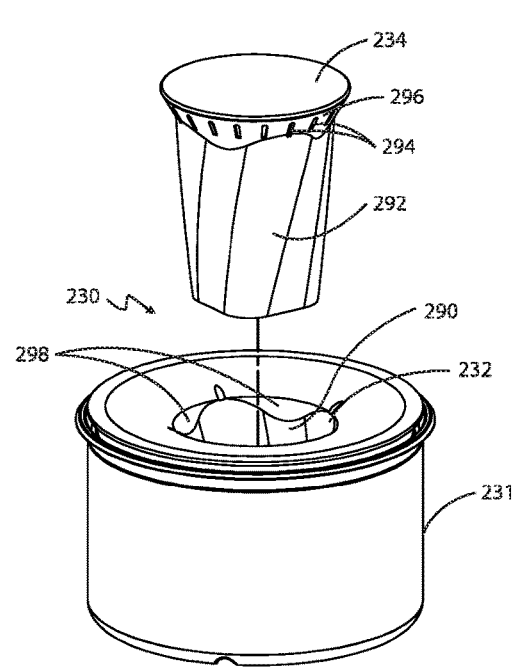
FIG. 45 illustrates an exploded view of the floatable body.

Referring now to FIG. 45, there is shown an exploded view of the floatable body 230 including the filter 234 and the floatable body member 231. The filter adapter opening 232 is shown to have a twisted, contoured inner surface 290 corresponding to a twisted, contoured outer surface 292 of the filter 234. As illustrated in FIG. 46, the filter 234 is securely received in filter adapter opening 232 by inserting the filter and slightly twisting the filter, creating a liquid seal between the filter and the opening 232 once completely seated in the filter adapter opening 232. The filter 234 has a generally rectangular shape, but has smoothed and/or rounded corners as shown. The filter 234 has a plurality of radially extending intake openings 294 configured to draw unfiltered water from the upper portion 238 of cavity 208 into the filter for filtering by the filter media (not shown). Filtered water is dispensed from the filter 234 via openings 282 into the lower portion 240 of the cavity 208. The rotational arrow above the filter 234 indicates the direction of rotation for removing the filter 234 from the floatable body member 231.

Referring to FIG. 47, there is shown a perspective view of filter 234. FIG. 48 shows a front view of filter 234, FIG. 49 shows a left side view of filter 234, FIG. 50 shows a right side view of filter 234, FIG. 51 shows a back side view of filter 234, FIG. 52 shows a top view of filter 234, FIG. 53 shows a bottom view of filter 234, and FIG. 54 shows a side perspective view of filter 234. As previously discussed with respect to FIG. 45, the filter 234 is generally rectangular but has curved edges that are twisted and contoured such that the filter 234 and which conform to the opposing twisted and contoured inner wall 290 of floatable body member 231. The outer surface of filter 234 is smooth about its circumference, such that the filter 234 twists about 20 degrees as it is received in the floatable body member 231. This contouring helps lock the filter 234 in place, and also provide a liquid seal between the filter 234 and the inner wall 290. The upper end of filter 234 is flared outwardly to form an annular surface 296. Surface 296 is angled, and conforms to an angled surface 298 formed about filter opening 232, as shown in FIG. 45.

Referring back to FIG. 44 in view of FIG. 20, the floatable body 230 has a height h that is about ⅓ the overall height H of cavity 208 (FIG. 20), where H=3 h. The volume of the gas-filled chamber 236 is engineered to take into account the weight of floatable body member 231, the seal 250, and the filter 234 such that the floatable body member 230 has a buoyancy configured to raise the floatable body member at the same rate that water is filtered through the filter. For instance, the buoyancy is configured such that the floatable body 230 rises from the bottom to the top of cavity 208 in about 8 minutes which rise time matches the time to filter the volume of unfiltered water in the configuration shown. In other embodiments, the height h of the floatable body may be as low as ¼ H, and may be as high as ½ H. The ratio of the floatable body 230 volume to the cavity 208 volume is about the same ratio which can vary between 1:2 and 1:4.

Though this disclosure has been described with respect to exemplary embodiments, many variations and modifications will become apparent to those skilled in the art upon reading the present application. The disclosure is therefore that the appended claims be interpreted as broadly as possible in view of the prior art to include all such variations and modifications. For instance, the container can be sized as a handheld device having an upper spout but without a handle, characterized as a tumbler. The container can also be configured with a lower dispensing spout disposed through the sidewall, such as a spicket, proximate the container bottom to allow the selective dispensing of filtered water. In another embodiment, the y-seal 250 can be coupled to the floatable body member in an inverted position, wherein the friction arrangement is reversed such that the friction is lower as the floatable body rises and higher when the floatable body is advanced toward the cavity bottom.

In another exemplary embodiment, the floatable body 230 can be comprised of a singular integral body having a body opening and a media filter defined therein, where the filter 234 is not used. In addition, the floatable body can be configured to have an integrated central body chamber in place of the filter opening configured to receive filter media wrapped in a fluid porous membrane, such as like a tea-bag filter. A pivoting lid covers the body opening, and can be opened to receive the modular filter media and then closed. The lid is configured to have openings to allow water to filter through the media filter, and the bottom of the body chamber also has openings to allow the filtered water to pass to the filtered water cavity of the pitcher. This embodiment allows a disposable modular filter media to be used without a plastic housing, thereby creating a green media filter solution.

Various non-limiting aspects of embodiments of a water filter system may comprise one or more of the following materials. Any of the floatable seals described and contemplated herein may comprise polypropylene (PP). Various embodiments of the floatable seals described and contemplated herein may comprise a float overmold comprising thermoplastic elastomer (TPE) and/or GLS Versaflex™ CL. Any of the containers, pitchers, cups and the like described and contemplated herein may comprise polycarbonate (PC) and/or clear acrylic. Various embodiments of the containers, pitchers, cups and the like described and contemplated herein may comprise a pitcher overmold comprising thermoplastic elastomer (TPE) and/or GLS Versaflex™ OM. Any of the pitcher lids described and contemplated herein may comprise PC and/or clear acrylic. Any of the filter sleeves contemplated and described herein may comprise PC and/or clear acrylic. Any of the sleeve lids, flaps, or other lids contemplated and described herein may comprise PC and/or acrylonitrile butadiene styrene. Various embodiments may further comprise stainless steel spring to bias the flap. Various embodiments may further comprise a PP filter top and filter bottom. Various embodiments of a water filter system may further comprise seal between the sleeve lid and the sleeve. This seal may comprise a silicone or any other O-ring known the art.

It will be understand that while the containers shown and referenced in most of the figures of this document comprises a pitcher, it is contemplated aspects of the water filter systems described herein may be applied to other containers without departing from the scope of this disclosure. For example, the water filter systems described herein may be adapted to cups, dog bowls, and coffee makers. Aspects of this described water filter systems may also be manufactured according to any methods known in the art. In some non-limiting embodiments, one or more of the floatable seal, the container, the filter sleeve, and/or lid are injection molded and/or blow molded.

One or more embodiments of the drinking water filter systems contemplated herein may further comprise a flavoring cartridge. The flavoring cartridge may be couple to one of the floatable seals described herein proximate the filter opening. More particularly, the flavoring cartridge may removably couple to the floatable seal near the base of the floatable seal. In still other embodiments, the flavoring cartridge is configured for use in place of the filter 40, and therefore sized to mount within the filter opening of the respective floatable seal. According to some aspects, the flavoring cartridge may be utilized with or without the filter 40, and is configured to add flavoring to the water as it passes through the flavoring cartridge. Flavors may include but are not limited to coffee flavors, tea flavors, fruit flavors, vitamin additives, electrolyte additives, energy additives, sweeteners, and/or any other drink additive known in the art.

In other embodiments of a drinking water filter system, the drinking water filter system comprises any of the containers and filters described throughout this document. Embodiments of the seal of these embodiments, however, differ from other seals described in this document. In one or more embodiments, the seal comprises a weighted seal that is configured to sink in water rather than float in water. In such an embodiment, the weighted seal may be configured similar to the floating seal described above, including but not limited to a filter opening, rings, and/or annular arms. The weighted seal, however, comprises a weighted annular body rather than an air filled chamber. The weighted annular body is weighted such that the seal sinks when placed on water. In other embodiments, the weighted seal comprises a plurality of weighted bodies comprising any shaped that allows the seal to sink when placed in water. The annular weighted body or plurality of weighted bodies may be placed within a chamber within the seal, or may form the body of the seal and are weighted such that when the seal is placed on water in the container, the seal sinks as unfiltered water passes through the filter from the area below the filter to the area above the filter. The weighted bodies may comprise varies metals, rubbers, or plastics.

In operation, embodiments of the weighted seal filter water as the weighted seal sinks in a container of unfiltered water. A weighted seal is placed on top of water in the container, the filter typically being coupled to the seal previous to the seal being placed on the water in the container. As the weighted seal sinks in the in the water, the unfiltered water passes from below the filter through the filter to the area above the filter. The rings and/or annular arms of the seal restrict water from passing between the seal and the walls of the container, as described in relation to other seal embodiments.

In still other embodiments of a drinking water filter system, the drinking water filter system comprises any of the containers and filters described elsewhere in this document. Embodiments of the seal of these embodiments, however, differ from the seals described in this document. In one or more embodiments, the seal comprises a handle coupled to the seal. In such an embodiment, the handled seal may be configured similar to the floating seal or weighted seal described above, including but not limited to a filter opening, rings, and/or annular arms. The handled seal may further comprise the weighted bodies or gas-filled chambers of previous embodiments or, alternatively, may lack comprise only a plate extending between the filter opening and the annular arms and/or rings. The handle is positioned on the seal such that when the seal is placed on water in the container, unfiltered water passes through the filter from the area below the seal to the area above the seal, or vice versa depending upon which direction the force is applied, as a user holding the handle applies a force to the seal.

In operation, embodiments of the handled seal filter water as the handled seal sinks in a container of unfiltered water. A handled seal is placed on top of water in the container, the filter typically being coupled to the seal previous to the seal being placed on the water in the container. Using the handle, a user then presses the seal downward. As the handled seal sinks in the in the water, the unfiltered water passes from below the filter through the filter to the area above the filter. The rings and/or annular arms of the seal restrict water from passing between the seal and the walls of the container, as described in relation to other seal embodiments. According to some aspects, the floatable seals contemplated herein are configured such that the filter 40 does not rest in the filtered water held in the container. Specifically, the floatable seals may comprise lips or other configurations that hold the base of the filter above the bottom of the respective floatable seal.

It will be understood that implementations are not limited to the specific components disclosed herein, as virtually any components consistent with the intended operation of a method and/or system implementation for a water filter system may be utilized. Accordingly, for example, although particular filters, containers, and seals may be disclosed, such components may comprise any shape, size, style, type, model, version, class, grade, measurement, concentration, material, weight, quantity, and/or the like consistent with the intended operation of a method and/or system implementation for a water filter system may be used.

What is claimed is:

1. A portable drinking water filter system, comprising:
   a floatable body surrounding a filter opening adapted to receive a water filter therein, the floatable body having a seal extending outward from an outer surface of the floatable body; and
   a container having an upper opening, a sleeve extending within the container from the upper opening to proximate a base of the container opposite the upper opening, the sleeve defining a cavity within the container and comprising one or more sidewalls surrounding the cavity, the cavity comprising an opening at a top of the sleeve and being open to and in fluid communication with the container proximate a bottom of the sleeve, the container further having a channel in fluid communication with the cavity, the channel extending outside of the cavity within the container from proximate to the base to proximate to the upper opening, wherein the floatable body is disposed in the cavity such that the seal is configured to engage the one or more sidewalls and restrict water from passing between the floatable body and the one or more sidewalls;
   wherein the floatable body is moveable within the cavity from a first position proximate the base to a second position proximate the upper opening.

2. The portable drinking water filter system as specified in claim 1, wherein the floatable body having a volume within the floatable body and the container having a volume within the container, wherein the ratio of the floatable body volume to the container volume being within the range of ¼ to ½.

3. The portable drinking water filter system as specified in claim 1, wherein the container comprises a pitcher having a handle, and the channel configured to dispense water in the cavity proximate the upper opening when tipped.

4. The portable drinking water filter system as specified in claim 1, wherein the seal has a movable extension configured to engage the one or more sidewalls at a first angle relative to the floatable body when the floatable body rises, and at a second angle different from the first angle when the floatable body lowers.

5. The portable drinking water filter system as specified in claim 4 wherein the seal comprises a y-ring comprising an upwardly extending distal tapered tip.

6. The portable drinking water filter system as specified in claim 5, wherein the y-ring has an inner portion recessed into a side of the floatable body and a web portion extending between the inner portion and the upwardly extending distal tapered tip, the web portion configured to allow the y-ring to bend about the web portion.

7. The portable drinking water filter system as specified in claim 4, wherein the seal has a first portion annularly engaged with the floatable body, and a web portion extending radially outward from the first portion toward the movable extension, the movable extension comprising an upwardly extending distal tapered tip flexibly coupled to the web portion, the distal tapered tip physically spaced from the first portion such that the web portion can flex to allow the distal tapered tip to change angles as the floatable body rises and lowers.

8. The portable drinking water filter system as specified in claim 1, further comprising an interchangeable water filter secured within the filter opening and surrounded by the floatable body.

9. The portable drinking water filter system as specified in claim 1, wherein the seal is configured to engage the one or more sidewalls and restrict water from passing between the floatable body and the one or more sidewalls independent of an orientation of the container.

10. The portable drinking water filter system as specified in claim 1, wherein the floatable body further comprises a plurality of balance tabs extending from one or more walls of the floatable body and positioned closer to the base than to the upper opening, the plurality of balance tabs configured to contact the one or more sidewalls.

11. The portable drinking water filter system of claim 1, wherein the sleeve is a removable sleeve engaged within the upper opening of the container and the cavity defined by the sleeve fills a majority of the container.

12. A pitcher, comprising:
    a floatable body surrounding a filter opening configured to receive a water filter therein, the floatable body having a seal extending outward from an outer surface of the floatable body; and
    a container having a handle, an upper opening and a base opposite the upper opening, and one or more sidewalls defining a cavity, the container having a channel in fluid communication with the cavity and extending outside the cavity within the container from proximate the base to proximate the upper opening, the channel configured to dispense water from the container proximate the upper opening when the container is tipped, wherein the floatable body is disposed in the cavity such that the seal is configured to engage the one or more sidewalls and restrict water from passing between the floatable body and the one or more sidewalls while the floatable body moves within the cavity from a first position proximate the base to a second position proximate the upper opening.

13. The pitcher as specified in claim 12 wherein the floatable body is configured to auto-retract toward the base, while maintaining engagement with the one or more sidewalls and relative orientation to the base, through suction created in the cavity by dispensing of water from the channel in response to the pitcher being tipped to pour water from the cavity via the channel.

14. The pitcher as specified in claim 13, wherein when the pitcher is tipped, the upper opening is positioned lower than the base and pouring water from the channel creates a vacuum that causes the auto-retraction of the floatable body in a direction away from the upper opening.

15. The pitcher as specified in claim 13, wherein the channel is in fluid communication with the cavity through a lower opening proximate the base, the seal is engaged with the one or more sidewalls above the lower opening after the floatable body is auto-retracted to its lowest position within the cavity.

16. The pitcher as specified in claim 12 wherein the seal comprises a y-ring comprising an inner portion recessed into a side of the floatable body and a web portion extending between the inner portion and the upwardly extending distal tapered tip, the web portion configured to allow the y-ring to bend about the web portion.

17. The pitcher as specified in claim 12 wherein the floatable body has a downwardly extending portion configured to encapsulate a space below the filter opening.

18. The pitcher as specified in claim 17 wherein the downwardly extending portion comprises an air-filled cavity.

19. The pitcher as specified in claim 12 wherein the cavity has a height H, and the floatable body has a height h, wherein the height h is between ¼ H and ½ H.

20. The pitcher as specified in claim 12 further comprising a water filter disposed in the filter opening.

21. The pitcher as specified in claim 20 wherein the water filter has a contoured outer surface contoured with a consistent contour extending for a majority of its height that is configured to cause the water filter to twist as it is inserted into the filter opening and create a liquid seal.

22. The pitcher as specified in claim 12, wherein the seal is configured to engage the one or more sidewalls and restrict water from passing between the floatable body and the one or more sidewalls independent of an orientation of the container.

23. The pitcher as specified in claim 12, the pitcher further comprising a removable sleeve within the container and extending from the upper opening to proximate the base, the sleeve forming the one or more sidewalls surrounding the cavity and leaving the cavity open at a top of the sleeve and open to the container adjacent a bottom of the sleeve, the channel extending between the container and the one or more sidewalls of the sleeve.

24. The pitcher as specified in claim 12, wherein the floatable body further comprises a plurality of balance tabs extending from one or more walls of the floatable body and positioned closer to the base than to the upper opening, the plurality of balance tabs configured to contact the one or more sidewalls.

25. A portable water pitcher, comprising:
a floatable body surrounding a filter opening adapted to receive and engage a replaceable water filter therein, the floatable body having a seal extending outward from an outer surface of the floatable body; and
a container having a handle, an upper opening and a base opposite the upper opening;
a removable sleeve positioned within the container and extending from proximate the upper opening to proximate the base, the sleeve defining a cavity within the container and comprising one or more sidewalls continuously surrounding the cavity with an opening at a top end of the cavity and proximate a bottom end of the cavity;
a spout positioned between the one or more sidewalls of the removable sleeve and the container, the spout extending outside of the cavity within the container from adjacent to the base to adjacent to the upper opening;
wherein the floatable body is disposed in the cavity with the seal engaging the one or more sidewalls to restrict water from passing between the floatable body and the one or more sidewalls as the floatable body moves between a raised position adjacent the upper opening to a lowered position adjacent the base;
wherein engagement of the seal with the one or more sidewalls creates a vacuum in the cavity between the floatable body and the base as water is dispensed through the spout adjacent the upper opening to auto-retract the floatable body to toward the base while maintaining the engagement of the seal with the one or more sidewalls and an orientation of the floatable body in relation to the base as the pitcher is tipped to pour water from the spout.

26. A portable drinking water filtering pitcher, comprising:
a floatable body surrounding a filter opening adapted to receive water filter media therein, the floatable body having a seal extending outward from an outer surface of the floatable body; and
a container having a handle, an upper opening and a base opposite the upper opening, and one or more sidewalls defining a cavity, the container having a channel in fluid communication with the cavity and extending outside the cavity within the container from proximate the base to proximate the upper opening, the channel configured to dispense water from the container proximate the upper opening when the container is tipped, wherein the floatable body is disposed in the cavity such that the seal is configured to engage the one or more sidewalls and restrict water from passing between the floatable body and the one or more sidewalls;
wherein the floatable body is moveable within the cavity from a first position proximate the base to a second position proximate the upper opening of the container and is engaged with the one or more sidewalls such that the floatable body auto-retracts toward the base, while maintaining engagement with the one more sidewalls and relative orientation in relation to the base, through suction created in the cavity by dispensing of water from the channel in response to the pitcher being tipped to pour water from the channel.

27. The pitcher as specified in claim 26, the pitcher further comprising a removable sleeve within the container and extending from the upper opening to proximate the base, the sleeve forming the one or more sidewalls surrounding the cavity and leaving the cavity open at a top of the sleeve and open to the container adjacent a bottom of the sleeve, the channel extending between the container and the one or more sidewalls of the sleeve.

28. The pitcher as specified in claim 26, wherein the suction created in the cavity moves the floatable body in a direction opposite a direction of the water movement through the channel.

* * * * *

UNITED STATES PATENT AND TRADEMARK OFFICE
CERTIFICATE OF CORRECTION

PATENT NO. : 9,796,600 B2
APPLICATION NO. : 15/348888
DATED : October 24, 2017
INVENTOR(S) : Marcus J. Shotey, Jason Swanson and David M. Daniel It is certified that error appears in the above-identified patent and that said Letters Patent is hereby corrected as shown below:

On the Title Page

Item (73) the Assignee should appear as follows:
Assignee: Bonvi Water, Inc., Scottsdale, AZ (US)

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*